United States Patent
Bland (10) Patent No.: US 8,938,476 B2
(45) Date of Patent: Jan. 20, 2015

(54) METHOD AND APPARATUS FOR A SUBSCRIBER DATABASE

(75) Inventor: Jonathan Bland, Bristol (GB)

(73) Assignee: Nokia Solutions and Networks Oy, Espoo (FI)

(*) Notice: Subject to any disclaimer, the term of this patent is extended or adjusted under 35 U.S.C. 154(b) by 282 days.

(21) Appl. No.: 13/003,964

(22) PCT Filed: Jul. 14, 2008

(86) PCT No.: PCT/EP2008/059195
§ 371 (c)(1),
(2), (4) Date: Jan. 13, 2011

(87) PCT Pub. No.: WO2010/006637
PCT Pub. Date: Jan. 21, 2010

(65) Prior Publication Data
US 2011/0125807 A1    May 26, 2011

(51) Int. Cl.
G06F 17/30 (2006.01)
H04W 8/18 (2009.01)
H04L 29/12 (2006.01)
H04W 8/04 (2009.01)

(52) U.S. Cl.
CPC .......... *H04W 8/18* (2013.01); *H04L 29/12188* (2013.01); *H04L 61/1588* (2013.01); *H04W 8/04* (2013.01)
USPC ........................... 707/802; 707/783; 709/229

(58) Field of Classification Search
CPC .............. G06F 17/30; G06F 17/30321; G06F 17/3002; G06F 17/30946
USPC ......... 707/609, 617, 620, 624, 625, 628, 631, 707/781, 785, 813, 820, 821, 825, 710, 711, 707/715, 741, 830, 783; 709/201, 223, 225, 709/229
See application file for complete search history.

(56) References Cited

U.S. PATENT DOCUMENTS

| 5,343,512 | A  | * | 8/1994  | Wang et al. ................. 455/410 |
| 5,742,905 | A  | * | 4/1998  | Pepe et al. .................. 455/461 |
| 6,976,017 | B1 | * | 12/2005 | Getchius ..................... 707/758 |
| 7,747,628 | B2 | * | 6/2010  | Tanzy ......................... 707/741 |
| 7,929,946 | B2 | * | 4/2011  | Rathus et al. ............... 455/411 |
| 2005/0136887 | A1 |   | 6/2005  | Pines et al. ................. 455/405 |
| 2008/0256250 | A1 | * | 10/2008 | Wakefield .................... 709/229 |
| 2010/0135473 | A1 | * | 6/2010  | Dewing et al. ............. 379/88.13 |

FOREIGN PATENT DOCUMENTS

GB  2 387 990 A   10/2003
RU  2300852 C2    6/2007

* cited by examiner

*Primary Examiner* — Greta Robinson
(74) *Attorney, Agent, or Firm* — Squire Patton Boggs (US) LLP (57) ABSTRACT

A method including receiving a request to change first information relating to a first identity of a subscriber in a database; obtaining information from said database relating to said first identity and at least one other identity of said subscriber; determining from the obtained information if said requested change can be made, in dependence on if said first identity is at least partially shared.

34 Claims, 5 Drawing Sheets

METHOD AND APPARATUS FOR A SUBSCRIBER DATABASE

FIELD OF THE INVENTION

The present invention relates to a method and apparatus.

DESCRIPTION OF RELATED ART

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

It has been proposed to provide a common subscriber database which is able to service a plurality of applications accessing the common subscriber database. One subscriber may have a plurality of different identities. The applications can include, for example HLR (home location register), HSS (home subscriber server), and AAA (Authentication Authorization and Accounting)

The inventor has identified a problem associated with integrating data for a plurality of applications into a common database. In particular, a problem has been identified with the management of the plurality of identities of a subscriber. Legacy provisioning systems may interface with the subscriber data for a single application, for example an HLR application, and do not consider the implication of operations which may effect data for other applications. For example, a command to delete an HLR subscriber which also has shared HSS data could potentially remove an identity from the subscriber which was shared between the HLR and HSS data.

SUMMARY OF THE INVENTION

According to one aspect of the present invention, there is provided a method comprising receiving a request to change first information relating to a first identity of a subscriber in a database; obtaining information from said database relating to said first identity and at least one other identity of said subscriber; determining from the obtained information if said requested change can be made, in dependence on if said first identity is at least partially shared.

According to another aspect of the present invention, there is provided an apparatus comprising means for receiving a request to change first information relating to a first identity of a subscriber in a database; means for obtaining information from said database relating to said first identity and at least one other identity of said subscriber; means for determining from the obtained information if said requested change can be made, in dependence on if said first identity is at least partially shared.

According to a further aspect of the present invention, there is provided a database comprising means for storing an association between at least one identity of a subscriber and a plurality of applications.

BRIEF DESCRIPTION OF DRAWINGS

For a better understanding of the present invention and as to how the same may be carried into effect, reference will be made by way of example only to the accompanying figures in which.

DETAILED DESCRIPTION OF EMBODIMENTS OF THE INVENTION

Figure 1:
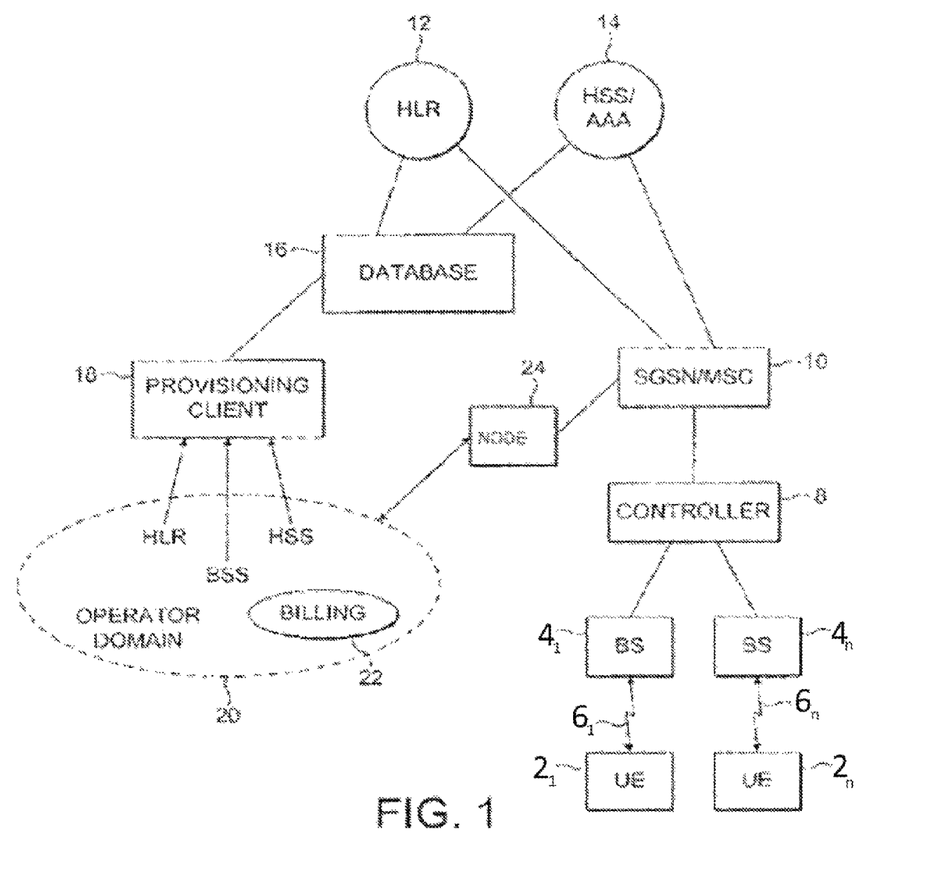
FIG. 1 shows a system in which embodiments of the present invention can be used.

Reference is made to FIG. 1 which shows one system in which embodiments of the present invention can be incorporated.

User equipment $2_1$ and $2_n$ are provided. The user equipment $2_1$ and $2_n$ can take any suitable form such as a mobile telephone, PDA "personal digital assistant", computer, laptop or the like. The user equipment $2_1$ and $2_n$ are arranged to communicate with base stations $4_1$ and $4_n$ via wireless interfaces $6_1$ and $6_n$. It should be appreciated that each base station is able to communicate with a number of different user equipment. In this document, the term "base station" is used. However, in some communication standards, the term "node B" is used. It should be appreciated that the general term "base station" is intended to cover any such entity as well as any other entity providing access to a network via a wireless link.

The base stations $4_1$ and $4_n$ are arranged to be connected to a controller 8. In some standards, the controller is called a base station controller whilst in other standards the controller is referred to as an RNC (Radio Network Controller). Again, the term "controller" is intended to cover any of these controllers or any other entity which is arranged to control base stations.

The controller is connected to a node such as a SGSN (Signalling GPRS (General Package Radio Service) Service Node) or a MSC (Mobile Switching Centre). It should be appreciated that typically the SGSN and MSC are separate nodes. Typical functions provided by this type of node is delivery of data to and from mobile stations including routing and transfer, mobility management, authentication and charging functions. This is by way of example only and such nodes may only do one or more of these functions or alternatively provide different functions.

The SGSN/MSC 10 is connected to an HLR (Home Location Register) 12 function. This is the entity which manages a user's profile such as indication what services the user has subscribed to, the tariff applicable, services which the user is permitted to use, and status information for those services. Other examples of information which can be included in the user profile:

Identity information (as described already).
Location information (stored VLR/SGSN (visitor location register/serving GPRS (general packet radio service) support node) address etc).
Authentication information.
Roaming restrictions (where subscriber is allowed to roam to).
Basic Services and any associated MSISDN Mobile Station International Subscriber Directory Number) identities (e.g. speech/fax/data etc).
Provisioned Call Forwarding/Call Barring/Supplementary Services and status.
Provisioned GPRS services and status.
Provisioned CAMEL/IN (Customized Applications for Mobile Network Enhanced Logic/intelligent network) services and status.
Operator Determined Barring services and status.
SMS (short message service) services and status.

The user profile may include one or more of the above mentioned information and/or include any other suitable information.

Previously, this user profile would have been stored in the HLR itself. However, in preferred embodiments of the invention, this user profile information including the subscriber identity is stored in a common database 16. The HLR user profile information mentioned above, including the user identities, may be stored in the common subscriber database.

Also shown is a HSS/AAA node (Home Subscriber Server/Authentication Authorization and Accounting). Both of these functionalities are IMS (Internet Protocol Multimedia Subsystem) functionalities. Two nodes may be provided one for the HSS function and one for the AAA function. The Home Subscriber Server (HSS), or User Profile Server Function (UPSF), supports the IMS network entities that actually handle calls. It manages the subscription-related information (user profiles), authentication and authorization of the user, and can provide information about the user's physical location. The data required to this is stored in the database 16. The functionality of the HSS is similar to that of the HLR 12, but for IMS calls.

Both the HLR 12 and the HSS/AAA 14 have access to the common database 16. This database will be described in more detail hereinafter. The database 16 is connected to a provisioning client 18. The provisioning client is connected to, for example an operator domain 20 which includes functions such as billing 22, subscriber management or the like. The provisioning requests may relate to the user profile/identity data stored for the HLR, HSS or other applications (AAA etc).

The operator domain in this example, OSS/BSS is either Operational or Business Support Systems, i.e. customer support/billing type systems which will be initiating the provisioning requests.

A node 24 may be provided between the SGSN/MSC and the operator domain or the SGSN/MSC may be connected directly to the operator domain. The connection may be via two or more nodes.

The database 16 embodying the present invention is arranged to provide a subscriber identity management function. The database will be a common data repository for all identities relating to a subscriber. Additionally, functionality for managing the addition and deletion of those subscriber identities is provided by embodiments of the present invention. It should be appreciated that the management of the addition and deletion of the subscriber entity can be provided by functionality associated with the database or with functionality associated with the provisioning client 18 or a combination of the two.

In terms of managing the subscriber identity, embodiments of the present invention may permit one or more of the following:

1. Add identity;
2. Delete identity;
3. Replace identity;

There are a number of different identity types in domain which can be supported. By way of example, those identities may include one or more of the following:

1. IMSI (International Mobile Subscriber Identity);
2. MSISDN (Mobile Subscriber International Subscriber Directory Number);
3. IMS Public User Identity;
4. IMS Private User Identity.
5. Aliased entries of any one or more of the above.

Figure 3:
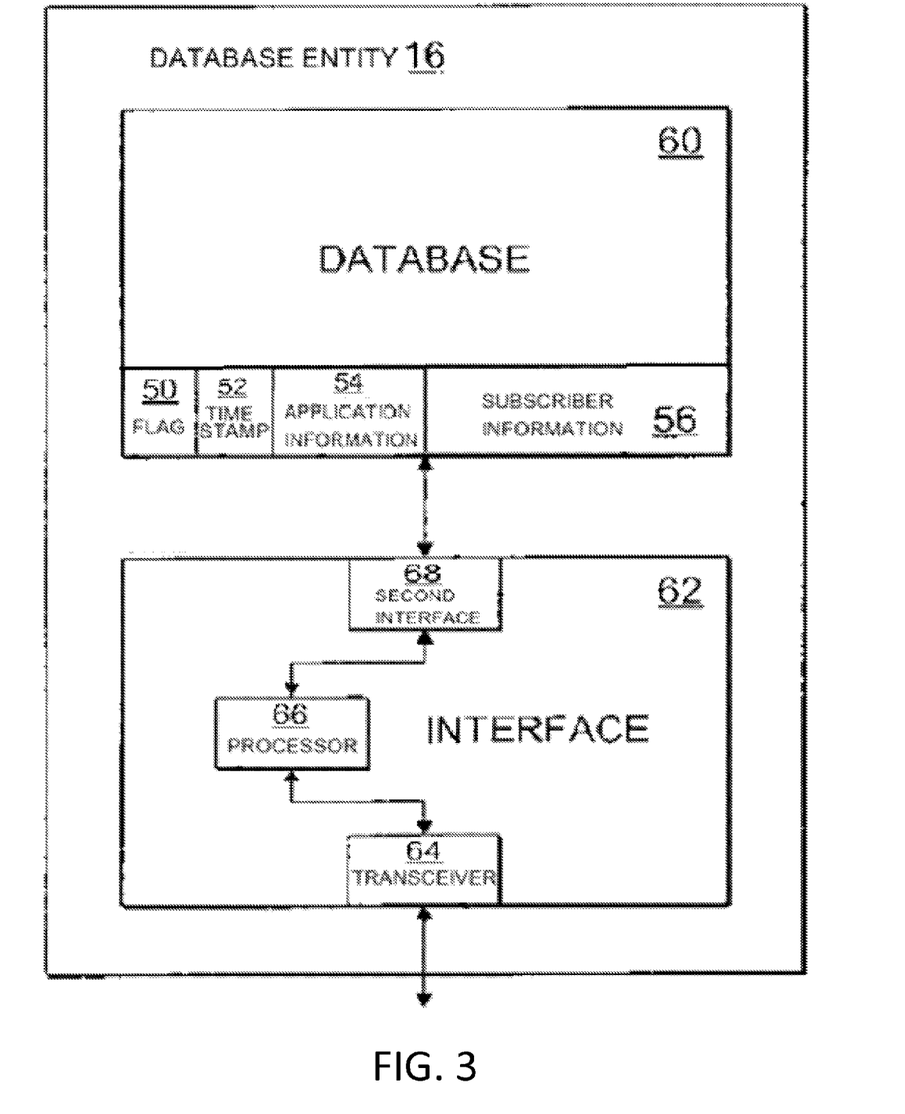
FIG. 3 shows a database embodying the present invention.

In embodiments of the present invention, a lock-flag 50 is provided. This will indicate if the subscriber identity data is currently locked as a result of an ongoing operation which modifies the list of identities for a given subscriber. This can be set to true or false, for example 1 or 0.

Embodiments of the present invention also provide a lock-flag time stamp 52. This indicates the time of the last update which sets the lock-flag attribute to true. If this time-stamp is out of date, then the lock-flag can be either ignored or changed back to false. This avoids the case where information about a subscriber is left in an incorrect locked state. The out of date time can be set to any desired value.

In embodiments of the present invention, the data is arranged to store the association between applications 54 and the subscriber identities 56 that they use. The application can be any suitable applications. By way of example, the application can be a HLR application, an HSS application or a MNP (Mobile Number Portability) application.

The Syntax used by way of example, may be as follows:

Application Data List
  identity index. The identity index is an integer.
  This is followed by an application data list application name which can be, for example a printable string. Examples of values are as follows:

```
"1 | HLR"
"2 | HSS"
"3 | MNP"
"4 | HSS"
```

Subscriber Identity List
  Additionally in the database, the list of identities currently associated with a subscription is stored. A compound Syntax is used which takes the following form:
Subscriber ID List Identifier—This is an Integer.
  This is followed by the subscriber ID list domain name, indicating the type of the identity. This is a printable string, in one embodiment of the invention.
  This is followed by the subscriber ID list identity which is a printable string.
  Examples of these values are as follows:

```
"1 | imsi | 23480000012345"
"2 | msisdn | 44970000012345"
"3 | publicID | PUBID_01_0142210100001234512E070011@other_ims_provider.co.uk"
```

Consider the following examples where a subscriber contains containing an MSISDN is shared by an HLR and MN application.

```
dn: id=00 11 22 33 44 55 66 77 88 99 AA BB,domainName=subsD, o=Apertio,c=UK
objectClass: subscription
lockFlag: FALSE
lockFlagTimestamp: 01-01-1970 01:00:00
applicationDataList: 1|HLR
applicationDataList: 2|HLR
applicationDataList: 2|MNP
subsIdList: 1|imsi|234860000012345
subsIdList: 2|msisdn|449730000012345
```

As can be seen, associated with a subscriber there are two identities, IMSI AND MSISDN. The second identity, MSIDN is associated with the HLR application and the MNP application.
An example below shows where a subscriber contains two HSS identities.

```
dn: id=00 11 22 33 44 55 66 77 88 99 AA BB,domainName=subsD, o=Apertio,c=UK
objectClass: subscription
lockFlag: FALSE
lockFlagTimestamp: 01-01-1970 01:00:00
applicationDataList: 1|HSS
applicationDataList: 2|HSS
subsIdList:
1|privateID|PRIVID_01_014210100000000012E07011@ims_provider.co.uk
subsIdList:
2|publicID|PUBID_01_014210100001234512E07011@other_ims_provider.co.uk
```

As can be seen, the subscriber ID list comprises 2 HSS identities: a public and a private identity.
Thus, embodiments of the present invention are arranged so that for each subscriber in the database there is stored a list of associations between identities and applications. Rather than acting directly on the identities provisioned to a subscriber, a provisioning client will instead add or remove the associations. Additional logic defined in the database and/or provisioning client can then update the subscriber identity information as required. For example, when the last association between an applications specific identity is removed, the database can automatically remove the identity from the subscription.

In summary, the subscription data includes the following: a subscriber ID list, each entry containing an identity, the type of identity and an index. The application data list has entries, each comprising an application name, for example HLR and an index value. This allows a subscriber record to contain a complete list of the identities provisioned to that subscriber and for each of those identities the complete list of applications which are associated with that identity.

The subscription means that operator (and network elements) know which network services the user (having a certain identity) can use in the network. Embodiments of the invention maps certain identity (and thereby also other information stored) to application(s). This information is then provided the applications. The applications may be BSF, HSS, HLR, a subscription server, authentication server, a security server or any other. The application may be a combination of two or more of the above. Embodiments of the invention may be used with authentication and/or subscriber servers or any other entity provided functions different to security and subscription services.

In one embodiment of the present invention, the provisioning client is arranged to add or remove an existing association. In an alternative embodiment of the invention, the processing performed to achieve addition or removal may be carried out by the provisioning client. In yet an alternative embodiment of the present invention, the processing may be carried out in combination between the database entity and the provisioning client.

In one embodiment of the present invention, the database operates in accordance with the LDAP (Lightweight Directory Access Protocol). However, in alternative embodiments of the present invention, a different protocol can be used.

It should be appreciated that various examples have given as to applications indicated in the database. It should be appreciated that the applications given, e.g. HLR, HSS, etc. are by way of example only and any other suitable application can be provided.

For example, Bootstrapping Server Function (BSF) is a function which mutually authenticates with the user equipment (UE) by using the authentication and key agreement (AKA) procedure, and agrees on session keys that are then applied between the UE and an operator-controlled network application function (NAF). The BSF is hosted in a network operator controlled network element and can retrieve user related information from an HLR or HSS.

Applications interacting with subscriber data may be applicable with embodiments of the present invention. The information which is to change may relate to one or more of the following: barring, supplementary services, call forwarding, roaming, GPRS and CAMEL services. In this regard, reference is made to the information, described previously which may be provided as part of the user profile.

Various examples of identity have been given. It should be appreciated that any alternative or additional lift of identities can be included. For example, email addresses in the form of SIP (Session Initiated Protocol) URL (Universal Resource Locator) can be used.

Embodiments of the present invention have been described in the context of adding or deleting entries. It should be appreciated that these two functions effectively allow information to be added, removed or changed.

Figure 2:
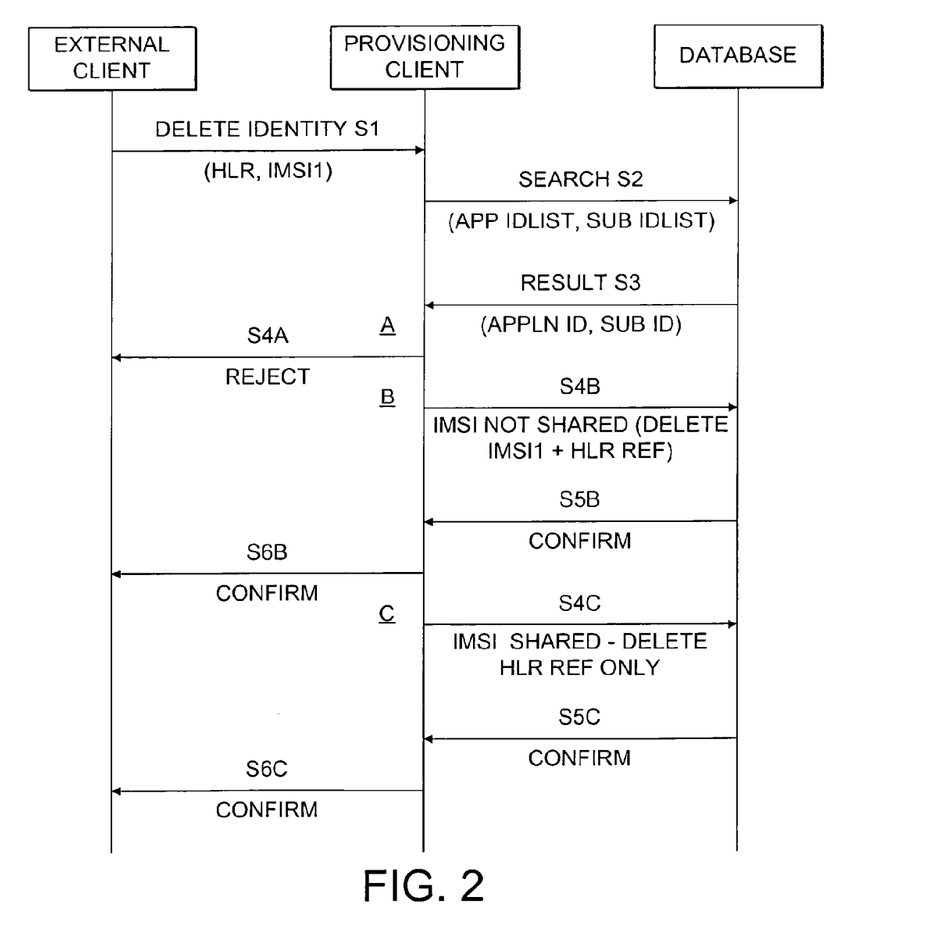
FIG. 2 shows signal flows embodying the present invention.

Reference is made to FIG. 2 which shows a signal flow of a method embodying the present invention.

In the first step S1, a message is sent from an external client to the provisioning client. The external client can take any suitable client and may, for example be from a billing client in the operator domain. The external client requesting the change may be in the operator domain but not necessarily. A request is sent in step S1 requesting the deletion of an identity. The application to which the identity relates is an HLR application and the identity is IMSI 1. The provisioning client will either receive information identifying that the application is an HLR application or the provisioning client is arranged to determine, based on the source of the request, that the application in question is an HLR application.

The provisioning client, in step S2 sends a search request to the database requesting an application list and identity list associated with the subscriber. In other words, all of the subscriber information associated with the subscriber having the IMSI 1 information is obtained and the result is sent in step S3 from the database to the provisioning client.

At this point, three different scenarios can occur. In scenario A, for one reason or another, the request for the deletion of an identity is rejected, for example because the flag is locked or because the subscriber identity does not exist or some other reason. The request may also be rejected if the HLR application and the subscriber identity are shared. This occurs in step S4a.

In a second scenario, scenario B, the provisioning client determines that the IMSI is not shared with any other application. Accordingly, an instruction is sent by the provisioning client to the database in order to delete the IMSI 1 identity and the associated HLR ref. This is sent in step S4B.

In step S5B, the database sends confirmation that the entry has been removed. This confirmation is sent for the provisioning client to the external client in step S6B.

In a third scenario, scenario C, a provisioning client determines that the IMSI is shared. Accordingly, it is determined that only the HLR reference should be deleted. In other words, another application uses that IMSI identity. The instructions sent in signal S4C is to remove the HLR reference only. In step S5C, a confirmation is sent from the database to the provisioning client. That confirmation is forwarded from the provisioning client to the external client in step S6C.

It should be appreciated that the actions taken by the provisioning client in determining if an instruction can be acted on, can in alternative embodiments of the invention be at least partially carried out in processing functionality associated with the database.

Figure 5:
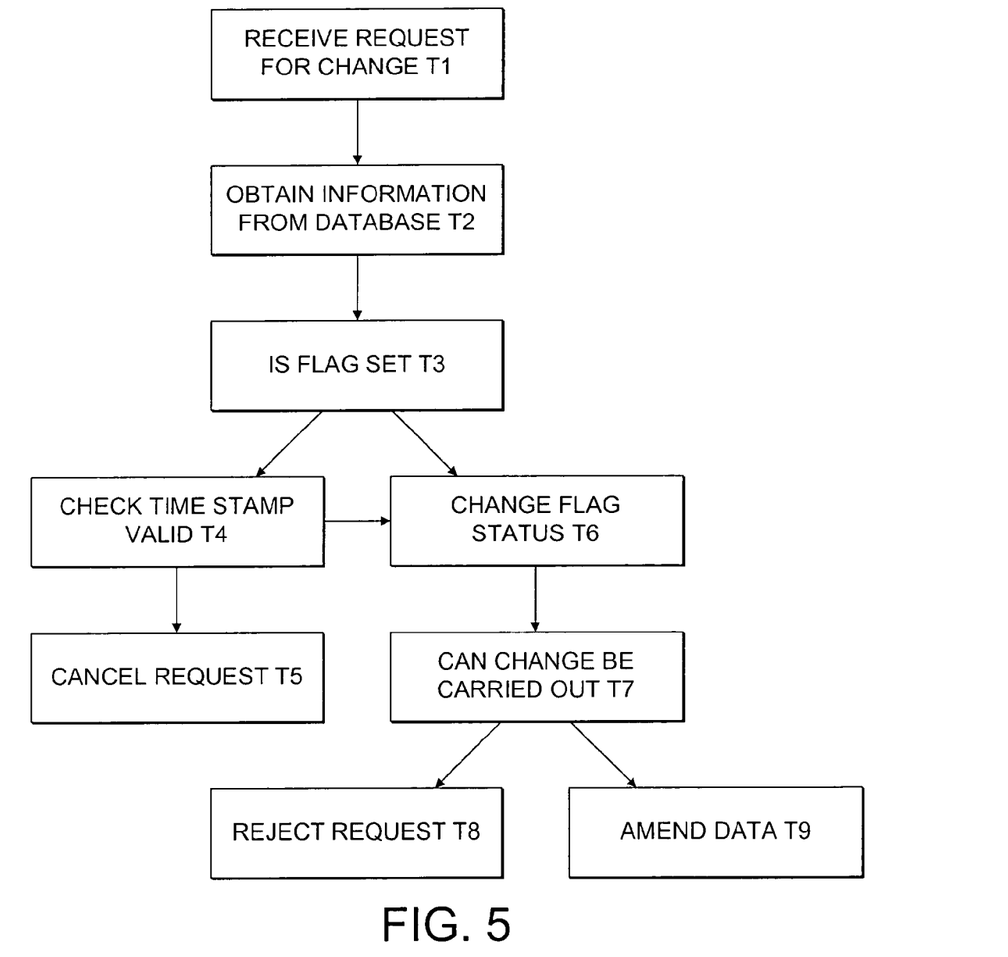
FIG. 5 shows a flow diagram of an embodiment of the present invention.

Reference is made to FIG. 5 which shows a flow diagram embodying the present invention.

In the first step T1, a request is received to change an entry in the database. This will include information relating to the identity of the subscriber. Application information is provided or determined.

In step T2, all the identity and application related data relating to a subscriber is obtained from the database. In other words, all of the subscriber identity information is obtained and not just for the identity included in the request.

In step T3, a determination is made as to whether or not the flag is set to a locked state implying that some other change is in the process of being made.

If the flag is locked, then the next step is step T4. The time stamp is then checked to see if the flag locked status is valid.

If the flag locked status is valid, the next step is step T5 when the request for change is cancelled. A message to this effect may be returned to the requester of the change.

If the flag is not locked or the flag locked status is invalid, the next step is step T6. The flag status is written back to the database to the locked state.

In step T7 the data obtained from the database is considered to determine if the requested addition or deletion operation can be carried out at least partially.

If the requested change cannot be carried out, even at least partially because the subscriber data is shared with another application of the same type, then the request is rejected in step T8 and a message to this effect may be sent to the requester.

If the requested change can be at least partially carried out, then the data is modified to the extent possible and written back into the database in step T9. A confirmation message may optionally be sent back to the requester.

In an alternative embodiment of the invention, the lock status flag and its associated date stamp can first be retrieved and only if the flag is not locked or invalidly locked is the rest of the data retrieved from the database.

The above describes the possible processing for a 'delete identity' operation.

An 'add identity' is similar and may for example be:
1) Read subscriber identity data
2) If new identity already in use by another (different) subscription, reject request.
3) If new identity already used by subscription, just add association with specified application.
4) If new identity not already used, add both identity and association to specified application.

Reference is made to FIG. 3 which shows a block diagram of the database entity 16. The database entity comprises a database 60 for storing the flags 50, the time stamp information 52, the subscriber information 56 and the application information 54 as described previously.

A processing interface 62 is provided for interface between the database itself and the provisioning client. The processing interface comprises a first interface 64 which is able to receive requests from the provisioning clients and send responses to the provisioning clients. The processing interface has a processor 66 which is arranged to receive the request from the first interface, obtain (read) the required data from the database 60, analyse the data, amend the data if required and write the data back into the database. The communication with the database is via a second interface 68 which allow the reading of data out and the writing of data into the memory. The processor is also arranged to formulate the required responses which are sent to the provisioning client via the transceiver 64.

The processor may simply read the data out and send that data to a provisioning client and write amended data received from the provisioning client into the database, in alternative embodiments of the invention.

Figure 4:
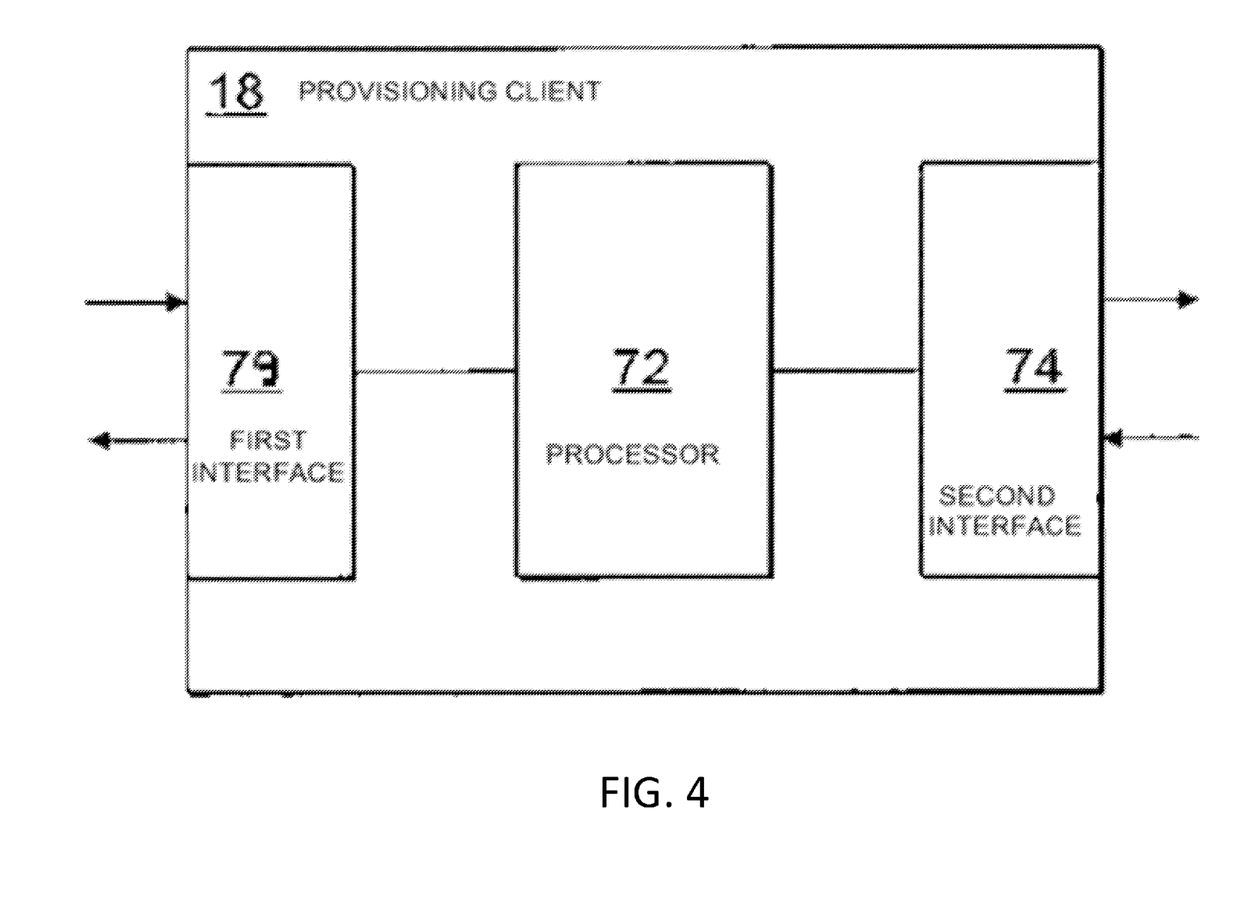
FIG. 4 shows a provisioning client embodying the present invention.

Reference is made to FIG. 4 which shows a block diagram of a provisioning client embodying the present invention. The provisioning client 18 has a first interface 70 for receiving a request from, for example, a billing domain. The first interface forwards the first request to the processor 72. The processor either checks for information in the request identifying the application or makes a determination of the application from the source. The processor is arranged to request from the database subscriber information and application for the subscriber, an identity of which is included in the request. The processor may reformulate the request or simply forward the request to the database. The request from the processor 72 is forwarded to the database via a second interface 74 which is also arranged to receive the information back from the database. The processor will analyze the data to determine if the change can be made and, if so, change the data and send it back to the database via the second interface 74. If not, the processor will send a message back to the requester via the first interface.

In an alternative embodiment, the provisioning client will simply forward the request to the database entity, optionally adding information relating to the application.

In one alternative embodiment of the invention, the external provisioning systems, such as the billing system in the example of FIG. 1, may be aware of data for other applications. For example, an external provisioning system would have information which would identify if a particular subscriber identity is associated with more than one application. Those one or more applications may be identified of the external provisioning system may simply be aware that there are other applications associated with an identity and thus not delete that identity from the database. Thus, the provisioning systems may be updated each time data for a new application is added to the common subscriber database. In this alternative embodiment, the association between identities and applications in the database may not be required.

In another alternative embodiment of the invention, a provisioning gateway may be provided, connected between the common subscriber database and the external provisioning systems. The provisioning gateway would be arranged to intercept the provisioning traffic and modify the provisioning traffic based on the current status of each subscriber. For example, if an external system wanted to delete an identity associated with a particular application, the provisioning gateway would determine whether the identity was shared with another application before determining if the identity can be deleted. The provisioning gateway would be arranged to be aware of the data dependencies for each application accessing the database. Thus the gateway would have information identifying the applications which are associated with a particular identity. In this alternative embodiment of the invention, the association between identities and applications in the database may not be required.

It is also noted that although certain embodiments were described above by way of example with reference to the exemplifying architectures of certain mobile networks, embodiments may be applied to any other suitable forms of communication systems than those illustrated and described herein. For example embodiments of the invention may additionally or alternatively be used with wireless area networks. It is also noted that the term access system is understood to refer to any access system configured for enabling wireless communication for user accessing applications.

Embodiments of the invention have been described in the context of networks where the user equipment is wireless equipment. It should be appreciated that some embodiments are additionally or alternatively applicable to wired networks where the user equipment is connected to a network via a wired connection.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer or processor.

The program code product for providing the operation may be stored on and provided by means of a carrier medium such as a carrier disc, card or tape. A possibility is to download the program code product via a data network. Implementation may be provided with appropriate software in a server.

For example the embodiments of the invention may be at least partially implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "lab" for fabrication.

It is also noted herein that while the above describes exemplifying embodiments of the invention, there are several variations and modifications which may be made to the disclosed solution without departing from the scope of the present invention.

The invention claimed is:

1. A method comprising:
   receiving a request to change first information relating to a first identity of a subscriber in a database;
   obtaining information, by a processor, from said database relating to said first identity, wherein the obtained information is structured to comprise:
   one or more identities of said subscriber, wherein the one or more identities comprise the first identity and another identity of said subscriber, and
   for each identity: the type of identity, and an identifier,
   one or more applications for respective identities of said subscriber, wherein,
   for each application: an application type and an index, wherein, if an identity is associated with an application, then the identifier of the identity corresponds to the index of the associated application; and
   determining from the obtained information if said requested change can be made, wherein the determining if said requested change can be made depends on if said first identity is associated with a plurality of applications.

2. A method as claimed in claim 1, wherein said application comprises at least one of an home subscriber server application, a boot strapping server function, an authentication server function, a home location server function.

3. A method as claimed in claim 1, wherein said request comprises a request to delete said first identity.

4. A method as claimed in claim 1, wherein said determining determines said information is to be deleted if said first identity is associated with no other application.

5. A method as claimed in claim 1, wherein said determining determines said information is to be partially deleted if said first identity is used by at least two different applications.

6. A method as claimed in claim 1, wherein said request to change comprises a request to add said first identity.

7. A method as claimed in claim 6, wherein said determining comprises determining if said first identity is used by a different subscriber and if so to reject said request to change.

8. A method as claimed in claim 6, wherein said determining comprises determining if said first identity is already used by said subscriber and if so change said information to add an association with an application identified in said request.

9. A method as claimed in claim 6, wherein said determining comprises determining if said first identity is used and if not to add said first identity and an association with an application identified in said request.

10. A method as claimed in claim 1, wherein determining comprises determining if a different attempt is being made to change information relating to said subscriber and if so preventing the carrying out of said requested change.

11. A method as claimed in claim 1, wherein said database is arranged to store user profile information associated with said first identity for said subscriber, said method further comprising the step of:
providing to an application at least part of said user profile information associated with said first identity.

12. A computer program product embodied on a non-transitory computer readable medium, the computer program product configured to control a processor to perform a process, comprising:
receiving a request to change first information relating to a first identity of a subscriber in a database;
obtaining information, by a processor, from said database relating to said first identity, wherein the obtained information is structured to comprise:
one or more identities of said subscriber, wherein the one or more identities comprise the first identity and another identity of said subscriber, and
for each identity: the type of identity, and an identifier,
one or more applications for respective identities of said subscriber, wherein,
for each application: an application type and an index, wherein, if an identity is associated with an application, then the identifier of the identity corresponds to the index of the associated application; and
determining from the obtained information if said requested change can be made, wherein the determining if said requested change can be made depends on if said first identity is associated with a plurality of applications.

13. Apparatus comprising:
means for receiving a request to change first information relating to a first identity of a subscriber in a database;
means for obtaining information from said database relating to said first identity, wherein the obtained information is structured to comprise:
one or more identities of said subscriber, wherein the one or more identities comprise the first identity and another identity of said subscriber, and
for each identity: the type of identity, and an identifier,
one or more applications for respective identities of said subscriber, wherein,
for each application: an application type and an index, wherein, if an identity is associated with an application, then the identifier of the identity corresponds to the index of the associated application; and
means for determining from the obtained information if said requested change can be made, wherein the determining if said requested change can be made depends on if said first identity is associated with a plurality of applications.

14. Apparatus as claimed in claim 13, wherein said application comprises at least one of an home subscriber server application, a boot strapping server function, an authentication server function, a home location server function.

15. Apparatus as claimed in claim 13, wherein said request comprises a request to delete said first identity.

16. Apparatus as claimed in claim 13, wherein said determining means is arranged to determine said information is to be deleted if said first identity is associated with no other application.

17. Apparatus as claimed in claim 13, wherein said determining means is arranged to determine said information is to be partially deleted if said first identity is used by at least two different applications.

18. Apparatus as claimed in claim 13, wherein said request to change comprises a request to add said first identity.

19. Apparatus as claimed in claim 18, wherein said determining means is arranged to determine if said first identity is used by a different subscriber and if so to reject said request to change.

20. Apparatus as claimed in claim 18, wherein said determining means is arranged to determine if said first identity is already used by said subscriber and if so change said information to add an association with an application identified in said request.

21. Apparatus as claimed in claim 18, wherein said determining means is arranged to determine if said first identity is used and if not to add said first identity and an association with an application identified in said request.

22. Apparatus as claimed in claim 13, wherein said determining means is arranged to determine if a different attempt is being made to change information relating to said subscriber and if so preventing the carrying out of said requested change.

23. Apparatus as claimed in claim 13, wherein said database is arranged to store user profile information associated with said first identity for said subscriber, said apparatus further comprises means for providing to an application at least part of said user profile information associated with said first identity.

24. Apparatus as claimed in claim 13, further comprising said database.

25. Apparatus as claimed in claim 13, further comprising a provisioning client.

26. Apparatus as claimed in claimed in claim 25, wherein said apparatus is arranged to determine an application associated with said request on the basis of information included in said request.

27. Apparatus as claimed in claim 25, wherein said apparatus is arranged to determine an application associated with said request based on a source of said request.

28. An integrated circuit comprising:
an apparatus, wherein the apparatus comprises:
means for receiving a request to change first information relating to a first identity of a subscriber in a database;
means for obtaining information from said database relating to said first identity, wherein the obtained information is structured to comprise:
one or more identities of said subscriber, wherein the one or more identities comprise the first identity and another identity of said subscriber, and
for each identity: the type of identity, and an identifier,
one or more applications for respective identities of said subscriber, wherein, for each application: an application type and an index, wherein, if an identity is associated with an application, then the identifier of the identity corresponds to the index of the associated application; and means for determining from the obtained information if said requested change can be made, wherein the determining if said requested change can be made depends on if said first identity is associated with a plurality of applications.

29. A chip set comprising:

an apparatus, wherein the apparatus comprises:

means for receiving a request to change first information relating to a first identity of a subscriber in a database;

means for obtaining information from said database relating to said first identity, wherein the obtained information is structured to comprise:
  one or more identities of said subscriber, wherein the one or more identities comprise the first identity and another identity of said subscriber, and
  for each identity: the type of identity, and an identifier, one or more applications for respective identities of said subscriber, wherein,
  for each application: an application type and an index, wherein, if an identity is associated with an application, then the identifier of the identity corresponds to the index of the associated application; and means for determining from the obtained information if said requested change can be made, wherein the determining if said requested change can be made depends on if said first identity is associated with a plurality of applications.

30. A database comprising:

means for storing an association between at least one identity of a subscriber and a plurality of applications, wherein said storing means is arranged to store a subscriber identity list having a plurality of entries, each entry comprising at least one identity and an identifier, and, to store an application data list, each entry of the application data list comprising an application name and an index, wherein, if an identity of the subscriber identity list is associated with an application of the application data list, then the identifier of the identity corresponds to the index of the associated application, the database is configured to determine whether information relating to the at least one identity of a subscriber in the database is to be changed depending on if said at least one identity is shared by the plurality of applications.

31. A database as claimed in claim 30, further comprising means for storing subscription related information for at least one of said plurality of applications, wherein the subscription related information is associated with the at least one identity.

32. A database as claimed in claim 31, further comprising means for providing at least part of the subscription related information to at least one application.

33. A database as claimed in claim 32, wherein the means for providing at least part of the subscription related information is configured to provide to an application the part of the subscription related information which is relevant for the application based on the association between the at least one identity of a subscriber and the application.

34. A database as claimed in claim 30 wherein the plurality of applications comprise at least one of a subscription server, authentication server, a home location register, a home subscriber server, a bootstrapping server function, a security server.

\* \* \* \* \*